United States Patent
Philpot et al.

(10) Patent No.: US 6,352,485 B1
(45) Date of Patent: *Mar. 5, 2002

(54) FIBER REINFORCED MOLDED PRODUCTS AND PROCESSES

(75) Inventors: Randall J. Philpot, Salt Lake City; Daniel K. Buckmiller, SLC, both of UT (US); Eric Richard Welsh, Sanderland, MA (US); David Wayne Erickson, Salt Lake City, UT (US)

(73) Assignee: Advanced Composites, Inc., Salt Lake City, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/781,125

(22) Filed: Jan. 9, 1997

Related U.S. Application Data (62) Division of application No. 08/289,656, filed on Aug. 12, 1994, now abandoned.

(51) Int. Cl.[7] .............................................. A63B 59/06

(52) U.S. Cl. ........................................ 473/564; 473/567

(58) Field of Search ................................ 473/535, 536, 473/558, 559, 564, 567

(56) References Cited

U.S. PATENT DOCUMENTS

| | | | |
|---|---|---|---|
| 3,147,975 A | 9/1964 | Gruss et al. ................... 273/82 |
| 3,258,511 A | 6/1966 | McGregor .................... 264/45 |
| 3,478,134 A | 11/1969 | Gruss et al. ................... 264/45 |
| 3,533,643 A | 10/1970 | Yamada ....................... 280/281 |
| 3,619,436 A | 11/1971 | Gruss et al. ................... 264/45 |
| 4,067,589 A | 1/1978 | Hon ............................. 280/278 |
| 4,298,556 A | 11/1981 | Rutsch et al. ............... 264/46.6 |
| 4,331,330 A | * 5/1982 | Worst .......................... 473/564 |
| 4,351,786 A | 9/1982 | Mueller ....................... 264/46.7 |
| 4,548,422 A | 10/1985 | Michel et al. ........... 280/281 R |
| 4,550,927 A | 11/1985 | Resele .................... 280/281 R |
| 4,565,383 A | 1/1986 | Isaac ........................... 280/276 |
| 4,614,627 A | 9/1986 | Curtis et al. ................ 264/46.6 |
| 4,682,773 A | * 7/1987 | Pomilia ....................... 473/457 |
| 4,714,575 A | 12/1987 | Preston ....................... 264/46.4 |
| 4,770,929 A | * 9/1988 | Nobumasa ................... 442/278 |
| 4,848,745 A | * 7/1989 | Bohannan ................... 473/119 |
| 4,923,203 A | 5/1990 | Trimble et al. .......... 280/288.3 |
| 5,011,172 A | 4/1991 | Bellanca et al. ......... 280/281.1 |
| 5,016,895 A | 5/1991 | Hollingsworth et al. .... 280/280 |
| 5,042,968 A | 8/1991 | Fecto .......................... 416/226 |
| 5,114,144 A | * 5/1992 | Baum .......................... 473/567 |
| 5,213,322 A | 5/1993 | Matsuo et al. .............. 271/275 |
| 5,301,940 A | * 4/1994 | Seki ............................ 473/567 |
| 5,303,917 A | * 4/1994 | Uke ............................. 473/567 |
| 5,348,296 A | 9/1994 | Frederikson ............... 273/72 R |
| 5,380,003 A | * 1/1995 | Lanctot ....................... 473/520 |
| 5,395,108 A | * 3/1995 | Souders ...................... 473/567 |
| 5,502,095 A | * 3/1996 | Ueshima ..................... 524/269 |

FOREIGN PATENT DOCUMENTS

| | | |
|---|---|---|
| FR | 895046 | 5/1943 |
| IT | 448310 | 5/1949 |

* cited by examiner

*Primary Examiner*—Stephen Blau
(74) *Attorney, Agent, or Firm*—Townsend and Townsend and Crew LLP (57) ABSTRACT

A method for manufacturing elongate articles such as baseball bats, paddles, oars, hockey sticks, generic tubing and other articles and articles including molded material molded about a preform. The preferred method includes manufacturing a filament wound preform and reaction injection molding material about the preform to result in a finished article. The preferred baseball bat includes an elongate filament wound preform about which a quantity of urethane foam is molded.

12 Claims, 4 Drawing Sheets

FIBER REINFORCED MOLDED PRODUCTS AND PROCESSES

This application is a division of U.S. patent application Ser. No. 08/289,656, filed Aug. 12, 1994, now abandoned.

I. BACKGROUND OF INVENTION

A. Field of Invention

The invention is directed to the field of elongate articles and methods for making them, such as baseball bats, oars, and any articles including tubing, such as bicycle frames, other bicycle components such as handlebars, bar ends, lugs, vehicle frames, handlebars and components for other vehicles such as motorcycles and all terrain vehicles, furniture, tennis rackets, golf clubs, ice and field hockey sticks, shoe inserts, wind turbine blades, propellers, pole vault poles, javelins, arrows, oars, paddles, gun stocks, archery bows, and other articles and their construction methods. More specifically, in one embodiment the invention is a baseball bat ("baseball bat" as used herein includes elongate articles of any type intended to be swung at a ball in the air, such as baseball and softball bats and children's versions thereof) that includes a continuous fiber reinforced composite preform about which expanded, cured foam is molded or about which thermosetting or thermoplastic elastomer (including urethanes or other systems) are molded. The invention also includes a method for making the baseball bat and the other articles listed above. All of the information contained herein relates not only to bats and other articles used for or useful for striking a ball, other projectile or other objects, but also for each of the numerous articles listed herein as capable of taking advantage of the invented structure or being made from the invented process.

B. The Background Art

Various methods for manufacturing composites are known. Among these were U.S. Pat. No. 3,147,975 to Gruss et al., U.S. Pat. No. 3,258,511 to McGregor, U.S. Pat. No. 3,478,134 to Gruss et al., U.S. Pat. No. 3,619,436 to Gruss, U.S. Pat. No. 4,298,556 to Rutsch et al., U.S. Pat. No. 4,351,786 to Mueller, U.S. Pat. No. 4,614,627 to Curtis et al., U.S. Pat. No. 4,714,575 to Preston, and U.S. Pat. No. 5,042,968 to Fecto, each of which is hereby incorporated by reference in its entirety for the material disclosed therein. These patents relate to the manufacture of various composite items, including golf clubs, propeller blades, bowling pins and baseball bats, among other items. Also in the prior art, it was known that baseball bats could be made from wood, aluminum or titanium, and that oars and paddles could be made from wood, metal or a combination of them. None of these prior art patents disclose the use of a composite preform (such as a filament wound preform) as a structural component which is placed in a mold where foam is reaction injection molded around the preform to create the desired article. Nor do these prior art patents disclose such baseball bat that includes an aluminum knob pinned and bonded to its handle. Further the prior art patents do not disclose the various steps of the manufacturing process considered to be a part of the invention, all as described in detail below.

II. SUMMARY OF INVENTION

It is an object of the invention to provide a baseball bat which is durable. It is a feature of the invented bat in the preferred embodiment that a filament wound preform about which urethane foam or elastomer is molded provides the basic structure of the bat. It is a feature of the invented bat that in a more preferred embodiment, the invented bat is a filament wound preform with a toughened resin matrix.

It is an advantage of the invented bat that it will not break as will a wooden bat, no matter which portion of the bat strikes a ball. Further, the invented bat has been found to propel a ball to distances at least comparable to traditional wood and aluminum bats even when the ball is not hit with the "sweet spot" of the bat. The invented bat has also been found to last with adequate performance for a greater number of hits than either wooden or aluminum bats.

It is an object of the invention to provide a baseball bat which is safe to use. As mentioned above, the structure of the bat effectively resists breakage and the potential for injury that accompanies such breakage. Further, however, it is a characteristic of the preferred materials of the invention, such as the composite preform and the moldable material of the preferred embodiment, to inherently absorb shock and vibration without the objectional metallic sound and accompanying vibration of prior art aluminum bats. Consequently, when a player strikes a ball with the invented bat, whether or not the ball is struck on the sweet spot of the bat, the bat will not exhibit substantial vibration of its handle (resulting in a "stinging" sensation to the user) which in prior art bats has the potential to injure the hands or arms of the player using the bat.

It is an object of the invention to provide a bat which is consistent. It is a feature of the invention that the materials from which the invented bat is made are not subject to substantial change or degradation over time or when exposed to various weather conditions, including varying humidity and temperature, in contrast to prior art wood bats and to a lesser extent prior art metal bats. Also, in contrast with wood bats which depend on the material wood and its accompanying irregularities, each of the invented bats that is produced can be made identical to each other, so players can readily switch bats without noticing performance differences. It is a further feature of the invention that the bat can be held and swung in any orientation to strike a ball without negative effect, in contrast to wood bats. It is a further feature of the invention that the sweet spot of the bat is typically quite large due to the internal consistency of the materials used. Consequently, it is an advantage of the invented bat that a player may hold the invented bat in any orientation and use it in any weather conditions over a long period of time with no variation in the performance of the bat.

It is an object of the invention to provide a bat which is price competitive while offering desirable performance characteristics. As a result of the preform and moldable material, which in the preferred embodiment are price competitive compared to other composite materials, and the manufacturing process which can be automated and is not labor intensive, very competitively priced but high quality bats can be produced.

It is an object of the invention to provide an elongate object which has a high strength to weight ratio. By using a filament wound or other composite preform, combined with a molded exterior, a finished article is produced which is inherently strong due to the materials and structure of the preform and due to a reinforcing effect of the molded materials about the preform. The materials used in the preferred embodiment have relatively low specific gravities in comparison to other intermediate and high strength materials, so the result is a very strong yet light finished article.

It is an object of the invention to provide safe, durable, consistent and competitively priced paddles, oars, bicycle frames, bicycle handlebars, other bicycle components, field and ice hockey sticks, shoe inserts, golf clubs, tennis rackets, furniture, gun stocks, wind turbine blades, propellers, generic tubing and other articles useful for a variety of purposes. Because all of these articles when constructed with the invented structure or according to the invented method incorporate the same advantageous features of the bat (as discussed above), each such article will also achieve these objects of invention.

It is an object of the invention to provide a manufacturing process that yields a durable, safe, consistent and inexpensive high performance articles, including baseball bats, oars, paddles, bicycle components, generic tubing, and other articles. Because the manufacturing process yields articles having the advantageous structure and characteristics discussed above, these objects are achieved by the manufacturing process.

Additional objects, features and advantages of the invention will become apparent to persons of ordinary skill in the art upon reading the remainder of the specification and upon referring to the attached Figures.

IV. DESCRIPTION OF THE PREFERRED EMBODIMENT

A. Process for Manufacturing the Article

In the preferred embodiment, the invention includes a number of steps which, when performed, result in production of one of the invented articles. These steps are as follows.

Figure 6:
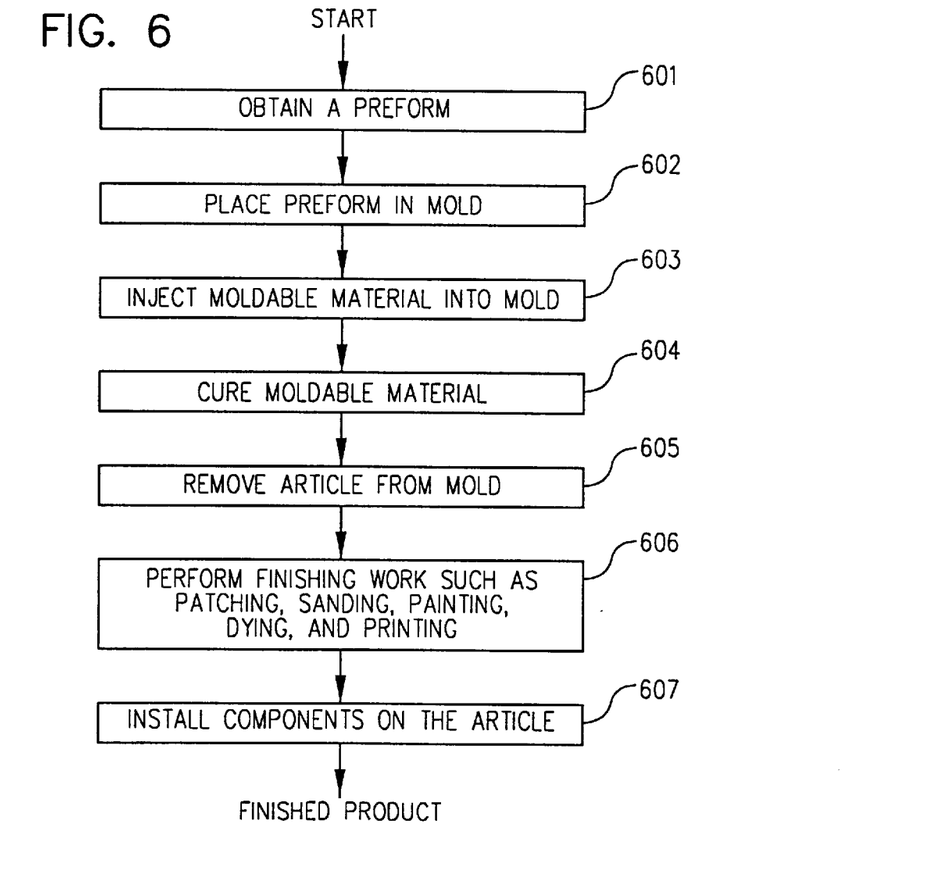
FIG. 6 is a flow chart of steps of the method of the invention.

Referring to FIG. 6, the first step of the manufacturing process 601 is to obtain (i.e. select or manufacture) a preform. The preform may be any rigid or semi-rigid (i.e. flexible) elongate object and its purpose is to provide a desired structural integrity to the article. Typically the preform is selected to approximate the shape of the article to be manufactured, only smaller in outside diameter than the finished article. For other articles, the preform is larger than the outside diameter of the finished article; the preform is then machined to the desired shape and/or size.

In the preferred embodiment, the preform is made of composite materials. "Composite materials" as used herein shall mean matrix resin and reinforcing fibers or filament. Examples of suitable matrix resin include epoxy (such as heat cured epoxy), rubber modified epoxy, urethane, urethane/epoxy mixtures, epoxy/fiber, urethane/fiber, epoxy/urethane/fiber, rubber modified epoxy/fiber and others. Heat cured epoxy is preferred for oars and paddles, but for high impact items such as baseball bats, a matrix material that is more flexible with higher elongation and toughness is desired, such as a rubber modified epoxy resin or urethane elastomer. With a high impact article such as a bat, the article must be able to deflect without cracking or failing, so these resins are preferred because they enable deflection following impact. A corollary benefit is that a flexible resin will allow the reinforcing fiber to flex and rebound so that the preform is more responsive during impact. Examples of suitable fiber include graphite, carbon, glass (such as E or S glass), KEVLAR (trade name for "aramid fiber"), polyethylene, polyester, NYLON (trade name for "polyamide") and others. Examples of suitable filament include graphite, carbon, glass (such as E or S glass), KEVLAR (trade name for "aramid fiber"), polyethylene, polyester, NYLON (trade name for "polyamide") and others. In the case of a bat and the other articles listed above, graphite or carbon fiber are equally preferred in the preferred embodiment.

Preforms may be manufactured by many processes, including but not limited to pultrusion, roll wrapping, filament winding, lay-up and injection molding, although preforms with continuous filaments or fiber-reinforced are preferred. Preforms may also be made of more traditional materials such as metal, wood, plastic or other materials. In general it is desired that the composite material have the following characteristics: (1) high strength to weight ratio (including low total weight), and (2) a controlled amount of flex/rebound (without cracking or breakage), which is achieved by a combination of (a) the type of fiber selected—such as for stiffness, strength and weight characteristics, (b) the fiber orientation, (c) wall thickness, and (d) resin matrix, selected for (i) stiffness, (ii) strength, and (iii) elongation to failure.

For filament wound preforms, the preform may be wound by either wet or dry processes, as will be appreciated by those of skill in the art. If the preform is wet wound, the reinforcing fibers are dipped or passed through a resin bath wherein impregnation occurs prior to winding. In the dry winding process, resin transfer molding is used to coat the fibers after winding. In other embodiments, the preform may be formed by a combination of both wet and dry winding. After winding, the resin is cured.

For a filament wound preform, the fiber orientation is adjusted for each application. For the various portions of each article, fiber orientation may be selected to provide desired characteristics. For example, in a baseball bat barrel, low angle fiber orientation (with respect to the longitudinal axis of the bat) is preferred for the resiliency it will provide during impact. It may also be desirable to use a different fiber orientation on the handle of a baseball bat preform than on the barrel of the baseball bat preform. See FIG. 2 in this regard.

Figure 2:
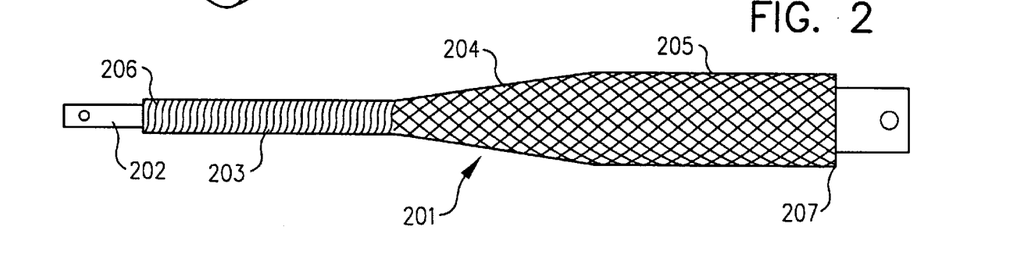
FIG. 2 depicts a side view of a filament wound preform of the invention on a mandrel.

In the preferred embodiment, the preform is a continuous fiber reinforced composite preform which has been manufactured using a filament winding process that utilizes a toughened resin matrix. FIG. 2 depicts such a filament wound preform 201 still on the mandrel 202 where it was manufactured. Because the preform 201 was manufactured on a mandrel, it will have a hollow passageway on its interior along its length. Other preforms need not be hollow, however. The cross-hatch pattern typical of filament-wound objects is visible in the Figure. The preform depicted is used for the manufacture of a baseball bat. Filament wound preforms are preferred because of their great strength and durability, while still being light weight, flexible and relatively inexpensive. Other composite materials could be substituted for a filament wound preform, such as a fiber-reinforced injection molded preform.

The preform may be selected or manufactured so that it has a profile which generally resembles that of the article to be manufactured. From the shape of the preform 201 depicted in FIG. 2 it can be seen that the article intended to be manufactured is a baseball bat. The preform 201 is an elongate object that includes a handle portion 203 at its first end 206 of a diameter appropriate for gripping by human hands, a striking portion 205 (or barrel) at its second end 207 of a diameter appropriate striking a ball, and a tapered portion 204 located between the handle portion 203 and the striking portion 205, the tapered portion 204 making a transition from the diameter of the handle 203 to the diameter of the striking portion 205.

The preform is selected or manufactured for certain desired physical characteristics. For example, if the article to be manufactured is a baseball bat, then the desired characteristics of the preform include strength, durability, light weight, flexibility, rebound, useful life, and cost effectiveness in achieving these characteristics. If, however, the article to be manufactured is a paddle or oar, then the preform is selected or manufactured to be strong in bending, light weight, and to have the desired flex. Preforms for other uses could be selected to have any of a variety of characteristics, including but not limited to torsional stiffness, impact resistance, and varying flex down the length of the preform. Other characteristics of the materials of the invention may be desired as well, and may be achieved by a selection of materials using the skill of a person skilled in the art.

In other embodiments of the invention the preform may take on a variety of shapes. For example, the preform used in the manufacture of a hockey stick or paddle shafting would preferably be an elongate object of a constant diameter. Preforms used for the manufacture of tubing used to make blades, paddles, oars, furniture, bicycle tubing, bicycle frames, various vehicle components, shoe inserts, tennis rackets, golf clubs, and other articles could be of a constant diameter or could vary in diameter, could be tapered, could be stepped or could be curved.

Figure 3:
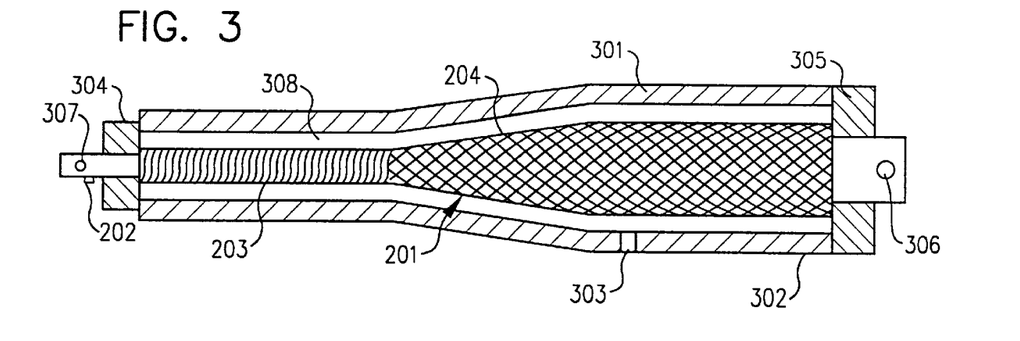
FIG. 3 depicts a sectional view of a preform of the invention within a mold before molding.

In some preferred embodiments, the preform is coated with a moldable material. Referring to FIGS. 6 and 3, in these embodiments, the second step of the manufacturing process 602 is to place the preform 201 into a female mold 301 and close the mold. While FIG. 3 shows the preform 201 still in place about a mandrel 202, that is not necessary in other embodiments of the invention, particularly in embodiments of the invention that do not utilize a filament wound preform.

The third step 603 of the manufacturing process is to inject into the mold 301 a moldable material. The moldable material is expected to collect and set in the gap 308 between the interior surface of the mold 301 and the exterior surface of the preform 201. It can be seen from the Figure that the interior dimensions of the mold 301 are chosen so that an object molded in it will have the shape of a baseball bat upon completion. Of course molds can be made to produce articles of any desired shape, including but not limited to the various articles listed herein. The mold includes the mold body 302 (typically in two halves in the case of a split mold such as that used in the preferred embodiment for an oar or paddle, although the bat mold in the preferred embodiment is not in two halves), an injection port 303 on the mold body into which moldable material may be injected, a first end mold cap 304 to prevent the escape of moldable material during molding, and a second end mold cap 305. Also depicted are a pin 306 and 307 at each end of the mandrel 202, the pins 306 and 307 being used for anchoring the end caps against the mold and holding the preform in place. Many anchoring means known in the art other than pins can be used to hold the end caps in place. It can be seen from the Figure that in the preferred embodiment molding takes place while the preform is still on the mandrel about which it was made. This is not necessary, however, to achieve the objects of the invention.

In the preferred embodiment, the moldable material which is injected into the injection port 303 to mold the desired article is a hardenable foam or elastomer, such as a urethane foam or elastomer that will assume and retain the shape of the mold to provide the finished article with the desired dimensions. This is referred to in the art as "reaction injection molding" or "RIM." In RIM, the foam or elastomer is injected in the mold to fill the mold and then hardens in place to form the article. Injection molding using a thermoplastic resin is an alternative to RIM in some embodiments of the invention. Other molding processes could be used as well. The moldable material must provide the article with the desired physical properties, however. If the article to be manufactured is a baseball bat, paddle or oar, then some of the most important desired physical properties of the moldable material include toughness (including impact resistance and abrasion resistance), some longitudinal stiffness and strength, and rebound following impact. Other desirable characteristics may include buoyancy, weatherability, ultraviolet resistance, coloration, geometric shape, surface resiliency, general aesthetics, texture, aerodynamics and hydrodynamics. One skilled in the art will determine the desired physical properties for the article to be made.

The moldable material which is to be molded about the preform serves a variety of functions. It establishes the exterior dimensions of the article and contributes to the appearance of the finished article. In the case of a paddle, it provides a very durable, positive, soft-grip, impact-resistant surface which contributes to the structural integrity of the paddle. In the case of a bat, careful selection of the moldable material (whether or not a mat or other filler is included with the moldable material) permits the manufacturer to custom tailor various properties of the bat, such as flexibility, strength and density and rebound following impact. The moldable material also provides a durable surface that distributes the loading on impact and protects the preform from possible failure due to impact. The combination of a composite preform with a foam or elastomeric moldable material are key to constructing a bat with good performance characteristics.

Either within the cavity of the mold or within the moldable material, a variety of fillers may be included to influence the properties of the moldable material once molded, and thereby to influence the properties of the manufactured article. For example, if the article being manufactured is a bat, then a piece of mat (typically having randomly arranged, discontinuous fibers, such as glass, graphite, aramid or other mat) may be placed into the mold about the preform in the vicinity of the tapered and barrel sections of the bat. The purpose of the mat is to strengthen, toughen and add some longitudinal stiffness to the moldable material. Other fillers that may be included are graphite and aramid, polyamide, polyester, polyolefin, discontinuous fibers, glass, and particulate fillers (i.e. rubbers, thermoplastics, cellulose, metals and ceramic). These fillers would be added to achieve toughness (including abrasion and impact resistance), control of flex/rebound of the moldable material, and to a lesser degree longitudinal strengthening or stiffness of the article.

The fourth step of the manufacturing process 604 is to cure or harden the moldable material in the mold. Depending upon the moldable material being used, this could require varying heat and time in the mold to facilitate curing or hardening.

The fifth step 605 of the manufacturing process is to remove the molded article from the mold. The article at this point has moldable material molded about a preform. Removing the molded article from the mold typically only requires opening the mold and lifting the article from one of the mold halves or permitting the article to fall from one or both of the mold halves. In the case of the bat mold, the preform will be extracted or pulled from the barrel end of the mold once the pins and end caps have been removed. This type of mold eliminates a seam line down the length of the bat, resulting in minimization of finishing work required.

Figure 4:
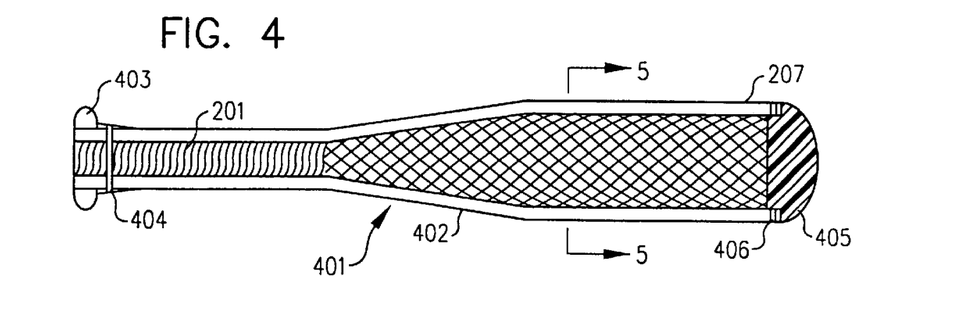
FIG. 4 depicts a side view in cross section of a finished bat of the invention.

The remaining steps of the manufacturing process may include installing various components on the article 607 and performing any finishing work 606. Referring to FIG. 4, if the article being manufactured is a bat 401, then in the preferred embodiment, a knob 403 could be installed at the first end 206 of the preform 201 in the vicinity of the handle 203. The knob 403 is typical in size and shape of knobs of traditional baseball bats. The knob 403 is securely fastened to the bat 401. Such fastening may be accomplished by adhesively bonding the knob 403 to the preform 201 (such as by the use of a glue or epoxy), by using a pin 404 to secure the knob 403 to the preform 201, and/or by the use of any other fastening mechanisms or techniques, such as rivets, bolts, screws or welding (including plastic welding). In alternative embodiments, the knob 403 may be molded into the bat 401. In the preferred embodiment the knob 403 is a machined piece of aluminum which provides the bat with a quality and rugged look and feel, while being weighted to provide the bat 401 with proper balance. Alternatively, the knob could be made of any known material such as cast aluminum, other metal, wood, plastic, foam, elastomer or composites. It is believed that the weight of an aluminum knob enhances bat weighting and balance and assists in properly locating the bat's sweet spot and reduces vibration or "stinging" caused by impacting the bat with a ball.

At the second end of the preform 406, a bat end cap 405 is installed to cover the longitudinal hole in the preform and to provide the bat with the proper weighting or end loading for proper swing. The end cap 405 should be designed to permit the bat to flex during impact. Characteristics necessary for this flex include a rubbery or elastomeric, tough, abrasion resistant material (i.e. controlled hardness) with sufficient density to add the desired weight or end loading without detracting from the performance of the bat. In the preferred embodiment the end cap 405 is of the same material as the moldable material. The end cap may be produced as a separate component and installed on the bat or it may be molded in place integral to the rest of the bat, depending on the convenience of production. One type of end cap which may be used is a cast urethane elastomer end cap. In order to install such an end cap, a plug would be placed into the hollow cavity within the interior of the preform to ensure that the end cap is installed at a position that optimizes bat weighting and balance. Holes 406 would be formed (such as by drilling or prior molding) in the bat barrel 205. The end cap would then be molded at the second end of the bat 207 so that the moldable material would flow into the holes 406 and into the interior of the bat barrel and form an integral mechanical lock between barrel and end cap. In place of holes, slots could be ground, machined or molded into the inside of the preform to achieve the same type of mechanical lock. Also shown in the Figure is the exterior layer 402 of the baseball bat. The exterior layer 402 is made of moldable material and cosmetically hides the preform 201 as well as providing the bat with the following desirable functional characteristics already listed above.

If the article being manufactured is an article other than a baseball bat, then components of the article may be installed on the article similarly to installation of the bat knob. Other hardware or accessories may also be installed as desired.

In some preferred embodiments of the invention, the article may be milled or shaped. For example, if the article is formed by filament winding with a toughened resin matrix, the initial preform may be larger than the finished article. The preform is then milled or shaped to the final desired form. Some sanding, patching and painting of the article may also take place to make its surface smooth and presentable to customers. In some preferred embodiments, however, such finish work is not necessary because the molding process can be controlled to produce articles with sufficiently smooth and attractive surfaces that they do not require any further cosmetic finishing.

Another step which may be performed is the application of graphics to the article. In the preferred embodiment this is achieved by employing pad printing which is generally known in the industry or the use of adhesive backed labels (such as silk screening). Alternatively, the manufacturer may choose to paint or dye the article, or the manufacturer may choose to perform no printing, dying or painting.

Nearly any elongate article or tubing therefor may be manufactured using this invented process. The manufacturing process is ideal for producing tubing that must be light with a strong core, a controlled amount of stiffness, and a tough elastomeric exterior. Such applications include bats, paddles, oars, bicycle frame tubing, gun stocks, furniture, tennis rackets, golf clubs, ice hockey sticks, field hockey sticks, pole vault poles, javelins, arrows, archery bows, and generic tubing for any variety of uses.

B. Structure of the Invented Articles

In this discussion of the physical structure of the invented articles, all of the material above is incorporated by reference and is not repeated here in order to avoid redundancy.

Figure 1:
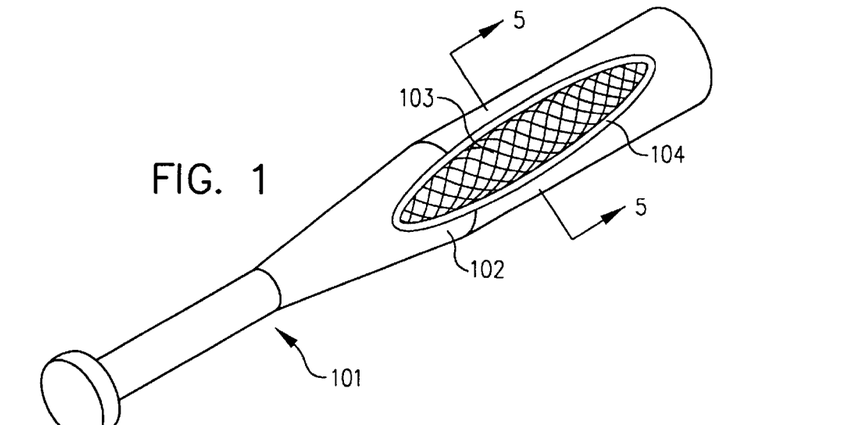
FIG. 1 depicts a perspective view of a baseball bat of the invention with a cut-away revealing the interior structure of the bat.

FIG. 1 depicts a perspective view of a baseball bat 101 with a cut-away that reveals the interior structure of the bat 101. The bat has an exterior surface 102 formed by the moldable material 104 which has been molded around the preform 103. The bat depicted is that which would result from reaction injection molding urethane foam as a moldable material 104 about a filament-wound preform 103. This structure is considered advantageous over bats and any other object of the prior art because of the performance, durability and low cost of the bat, as well as for the other objects of the invention listed above.

Figure 5:
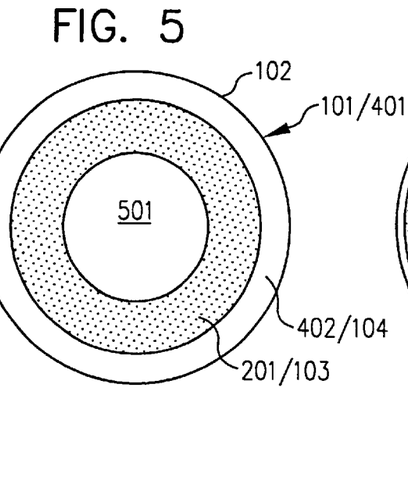
FIG. 5 is a cross section of the bat of FIG. 4 taken at 5—5.

FIG. 5 depicts a cross section of a bat 101 or 401 at 5—5 (from both FIGS. 1 and FIG. 4). It can be seen that the bat 101/401 has an outer surface 102, a depth of molded material 402/104 which has been molded about a preform 201/103, and a hollow cavity or passageway 501 along the longitudinal axis of the preform. In the preferred embodiment the passageway 501 results from manufacturing the preform by filament winding. In the preferred embodiment, the size and shape of the hollow passageway is determined by the shape of the mandrel used to wind the preform.

Figure 5A:
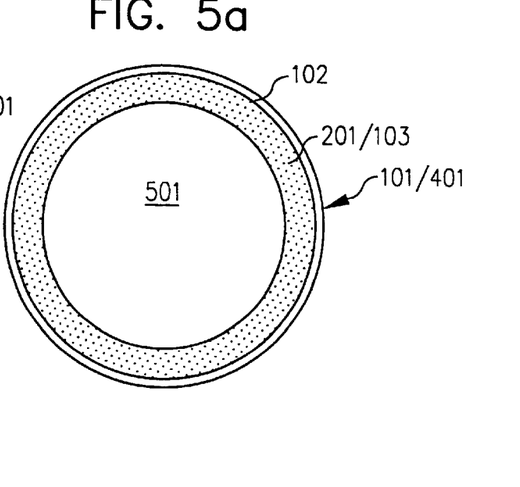
FIG. 5a is a cross section of an alternate embodiment of the bat at section 5—5.

FIG. 5a depicts a cross section of the best mode of the bat 101 or 401 at 5—5 (from both FIGS. 1 and FIG. 4). In the best mode, the bat 101/401 has an outer surface 102, a preform 201/103, and a hollow cavity or passageway 501 along the longitudinal axis of the preform. Passageway 501 results from manufacturing the preform by filament winding. In the preferred embodiment, the size and shape of the hollow passageway is determined by the shape of the mandrel used to wind the preform.

In the best mode, the resin matrix is a toughened or rubber modified epoxy resin with a cycloaliphatic amine curing agent. About 54% of the inner layers of the barrel are a hybrid of about 57% standard (33Msi) modulus graphite (by volume composite) and about 43% E-glass (by volume composite). The fibers are oriented at +/−25 degrees with respect to the longitudinal axis. The outer layers of the barrel (about 46%) are E-glass composite oriented at +/−25 degrees with respect to the longitudinal axis. The handle portion 203 is a hybrid of about 57% standard modulus graphite (by volume composite) and about 43% E-glass (by volume composite). These fibers are oriented at +/−15 degrees. Additional layers of E-glass composite are wound on top of the hybrid layers at an angle of about +/−25 degrees. These layers serve to compact the hybrid layers and are then ground off in a subsequent milling operation.

The fiber reinforcing in tapered portion 204 gradually increases in taper from the handle to the barrel. For example, the fiber orientation may start out at +/−15 degrees in the handle and gradually increase to +/−25 degrees in the barrel. As the taper gradually increases, so does the amount of E-glass composite on the outside surface of the bat.

Figures 7, 8:
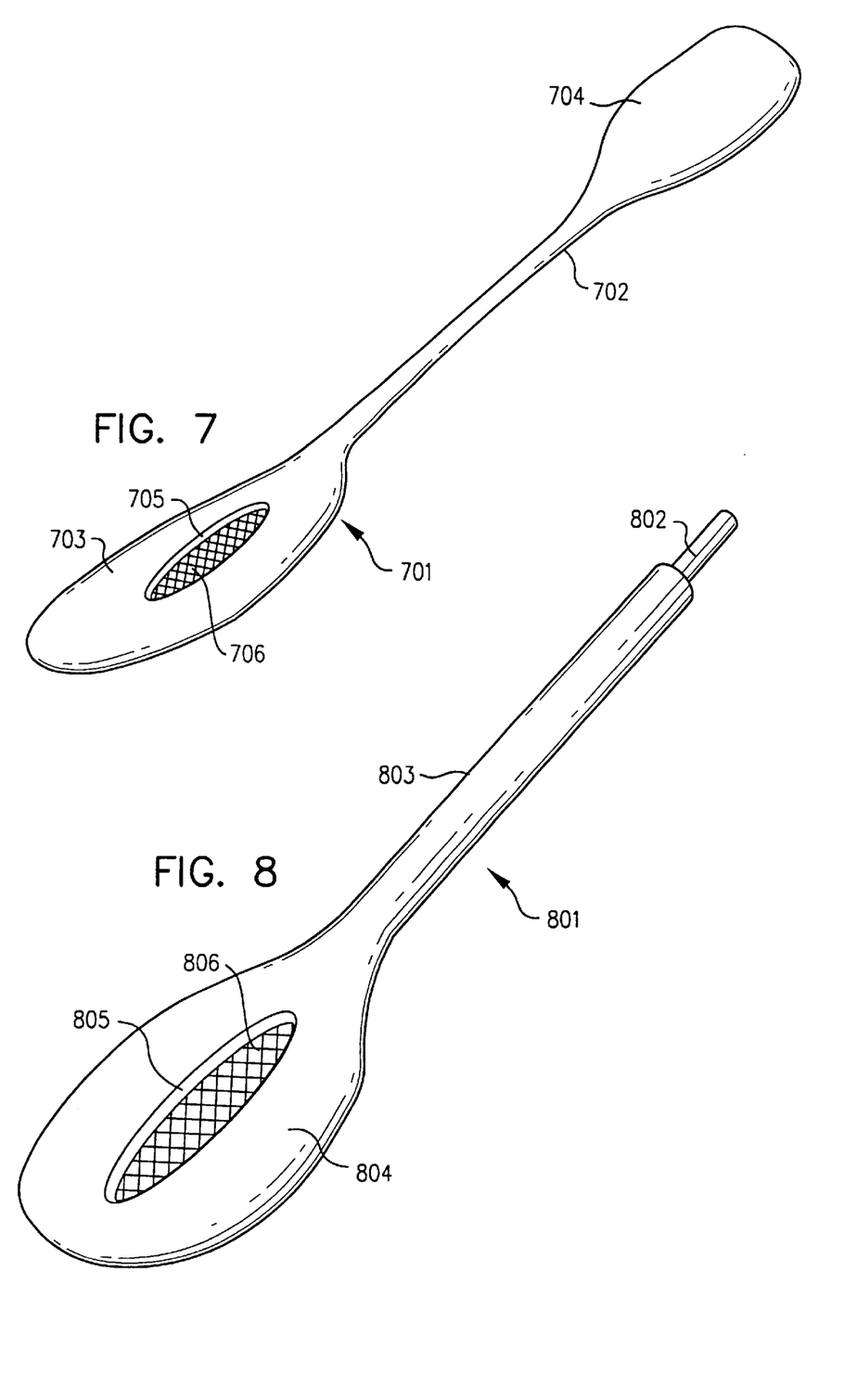
FIG. 7 depicts a paddle of the invention.
FIG. 8 depicts an oar of the invention.

FIG. 7 depicts a perspective view of a paddle 701. The paddle 701 includes a shaft 702, a first blade 704 and a second blade 703. Also shown is a cut-away which reveals molded material 705 about a preform 706. As shown in the Figure, the paddle 701 is manufactured by the invented manufacturing process which results in the shaft 702 including a preform 706 and molded material 705. The shaft 702 and blades 703 and 704 may be molded in one step about a single preform, or two or more preforms may be joined and molding then accomplished about the joined preforms. It is also possible to mold two separate paddle halves about respective preforms, and then join the finished product. The blades 703 and 704 may also be separately manufactured using the invented process, the shaft 702 may be manufactured, and the three may be jointed into a paddle 701 by any of a variety of known methods including the use of epoxy, adhesive, pins, bolts, screws or other fastening methods. In the preferred embodiment, however, two preforms are joined by use of a sleeve which fits within the passageway 501 (from FIG. 5) to 706 and is adhesively bonded therein. In the preferred paddle manufacturing process, the paddle blades are then offset by placing the paddle in a paddle blade orientation rack, resulting in a finished paddle 701.

FIG. 8 depicts a perspective view of an oar 801. The oar 801 includes a handle 802, a shaft 803 and a blade 804. Also shown is a cut-away which reveals molded material 805 about a preform 806. As shown in the Figure, the entire oar 801 is manufactured by the invented manufacturing process which results in both the shaft 803 and blade 804 including a preform 806 and molded material 805. A single preform 806 for the entire oar 801 may be made and then moldable material 805 may be molded about the preform to result in a finished oar. When oars, paddles, or other objects likely to be used in or near are manufactured in the invention, it should be noted that air which may be trapped within the internal longitudinal passage 501 of the preform (from FIG. 5) will provide the object with some desired buoyancy.

Figure 9:
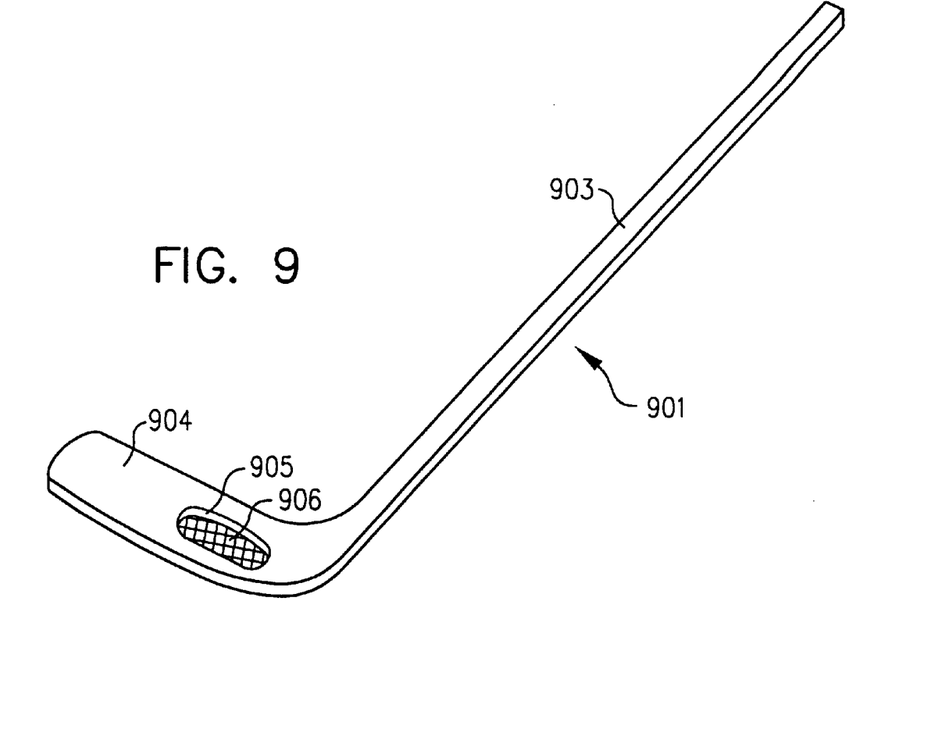
FIG. 9 depicts an ice hockey stick of the invention.

FIG. 9 depicts a perspective view of an ice hockey stick 901. The ice hockey stick 901 includes a shaft 903 and a blade 904. Also shown is a cut-away which reveals molded material 905 about a preform 906. As shown in the Figure, the ice hockey stick 901 is manufactured by the invented manufacturing process which results in a continuous preform serving for both the shaft 903 and the blade 904, following which moldable material 905 is molded about the preform to result in a finished product. Alternatively, the blade 904 and shaft 903 may be manufactured separately and then joined by any known method, including the use of epoxy, adhesive, pins, bolts, screws or other fastening methods.

Figure 10:
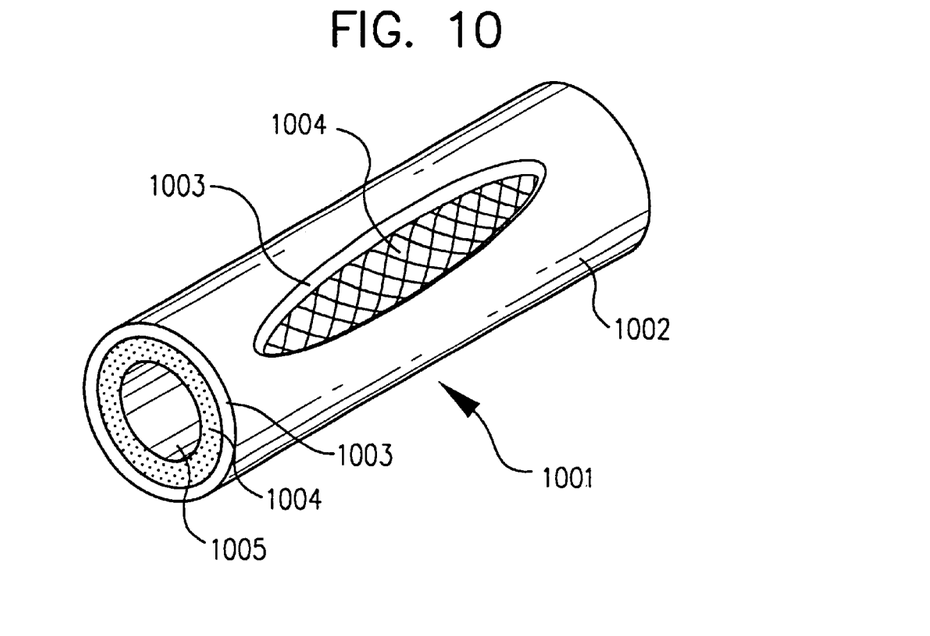
FIG. 10 depicts generic tubing of the invention.

FIG. 10 depicts a perspective view of a length of invented generic tubing 1001 manufactured by the invented manufacturing process. The tubing 1001 may be useful in any of a variety of applications, including in the construction of any of any articles that use tubing, such as bicycle frames, baseball bats, oars, paddles, ice hockey sticks, furniture, tennis rackets, golf clubs, arrows, archery bows, vehicle frames, and others. The tubing has an outer surface 1002 formed of molded material 1003. The molded material has a certain thickness and is molded about a preform 1004. In the preferred embodiment, the preform has a hollow cavity 1005 in its interior along its longitudinal axis as a result of having been manufactured by a filament winding process. The tubing is considered by the inventors to be advantageous over prior art tubing because it is light, strong, flexible, durable and inexpensive to manufacture.

The reader should note that the preforms depicted in the various Figures vary in size, shape and contour. For example, the preform used to manufacture a baseball bat in the preferred embodiment is tapered to the general contour of a baseball bat in the preferred embodiment, although other shaped preforms could be employed as well. The preform used in the ice hockey stick is generally rectangular in cross section, and the preform depicted in the generic tubing is round in cross section with no taper. In various embodiments of the invention, the preform could assume any shape because shape of the final product is controlled by the shape of the interior of the mold that will cure the moldable material. In the preferred embodiment, however, it is important to select an appropriate depth or thickness of moldable material which is to be molded about the preform to maximize performance characteristics, minimize cost and achieve a desired weight and balance of the finished article. Because the preferred preform is filament wound, a desired shape of the preform can be achieved by selecting a mandrel of that shape and then filament winding the preform on the shaped mandrel. Various cross-sectional shapes that could be employed in a preform include round, square, oval, triangular, pentagonal, hexagonal, heptagonal, octagonal, egg-shaped, tear-drop shaped, elliptical or other. In addition to being tapered, preforms could also be stepped in different diameters, of varying curvature, or otherwise.

While the present invention has been described and illustrated in conjunction with a number of specific embodiments, those skilled in the art will appreciate that variations and modifications may be made without departing from the principles of the invention as herein illustrated, described and claimed. The present invention may be embodied in other specific forms without departing from its spirit or essential characteristics. The described embodiments are to be considered in all respects as only illustrative, and not restrictive. The scope of the invention is, thereof, indicated by the appended claims, rather than by the foregoing description. All changes which come within the meaning and range of equivalency of the claims are to be embraced within their scope.

We claim:

1. A baseball bat including a first end, a handle adjacent the first end, a second end, a barrel adjacent the second end, a tapered portion between the handle and the barrel, said baseball bat comprising:

a hollow filament wound composite preform comprising a toughened resin matrix and continuous reinforcing fibers; and a quantity of hardened moldable material comprising urethane molded about the exterior surface of said composite preform; said moldable material further comprising a filler material or a mat material which reinforces said moldable material;

wherein said resin matrix is rubber modified epoxy; and wherein said reinforcing fibers are graphite, carbon, fiberglass, E-glass, aramid, polyamide, polyethylene or polyester.

2. The baseball bat as recited in claim 1 wherein said preform comprises a barrel having a barrel diameter, a handle having a handle diameter, and a central portion between said barrel and said handle;

wherein said handle diameter is smaller than said barrel diameter; and wherein said central portion is tapered between said barrel diameter and said handle diameter.

3. The baseball bat as recited in claim 1 wherein said reinforcing fibers comprise E-glass.

4. The baseball bat as recited in claim 1 wherein said reinforcing fibers comprise a mixture of E-glass and graphite.

5. The baseball bat as recited in claim 1 further comprising a knob adjacent said handle.

6. The baseball bat as recited in claim 5 wherein said knob is fastened to said handle by a pin and by adhesive bonding.

7. The baseball bat as recited in claim 1 further comprising:

an end cap installed in said barrel of said bat.

8. The baseball bat as recited in claim 7 wherein said barrel comprises a plurality of holes and wherein said end cap is affixed to said barrel by the holes in said barrel.

9. The baseball bat as recited in claim 7 wherein the end cap is integral to said barrel.

10. The baseball bat as recited in claim 1, wherein said filler material is selected from the group consisting of polyolefin, polyamide, graphite, aramid, glass, discontinuous fibers, particulate fibers, rubber, thermoplastic, cellulose and ceramic.

11. The baseball bat as recited in claim 1, wherein said mat material comprises randomly arranged, discontinuous fibers.

12. The baseball bat as recited in claim 1 further comprising printing on the exterior of said bat.

* * * * *